E. EASTLUND & J. A. JOHNSON.
TOOL FOR LEVELING SAW TEETH.
APPLICATION FILED OCT. 3, 1911.
1,028,448.
Patented June 4, 1912.
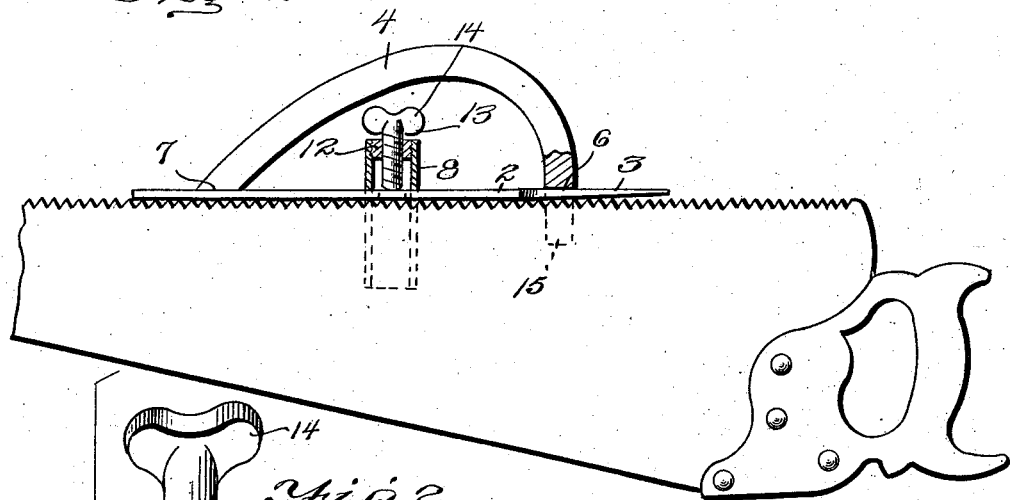
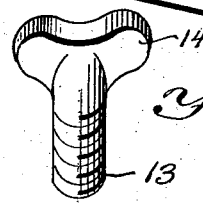
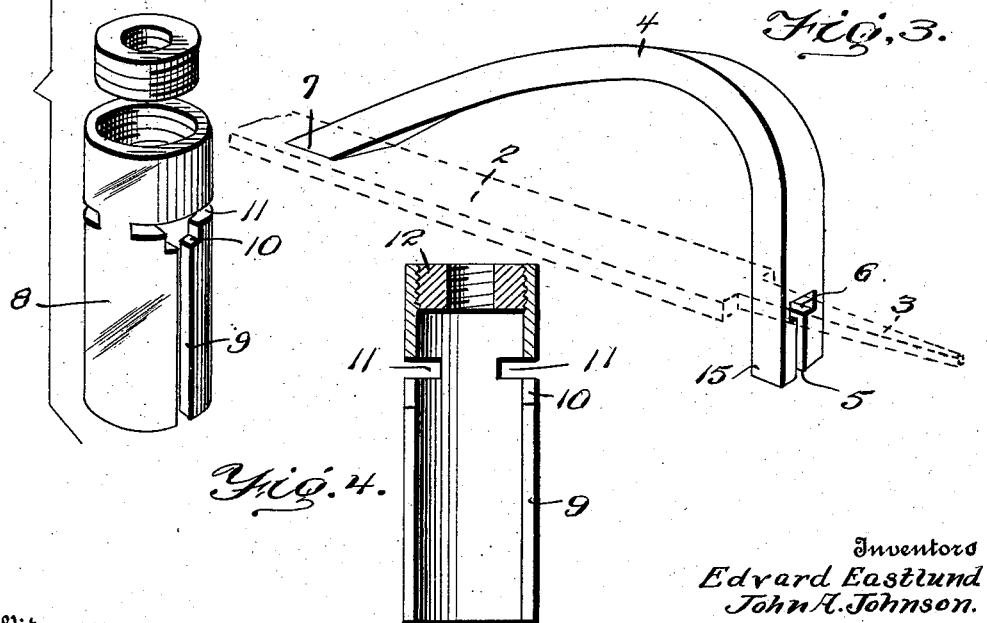
Witnesses
Inventors
Edvard Eastlund
John A. Johnson.
By
Attorney.

UNITED STATES PATENT OFFICE.

EDVARD EASTLUND AND JOHN A. JOHNSON, OF NEW YORK, N. Y.

TOOL FOR LEVELING SAW-TEETH.

1,028,448.     Specification of Letters Patent.     Patented June 4, 1912.

Application filed October 3, 1911. Serial No. 652,586.

*To all whom it may concern:*

Be it known that we, EDVARD EASTLUND and JOHN A. JOHNSON, citizens of the United States, residing at New York, in the county of New York and State of New York, have invented certain new and useful Improvements in Tools for Leveling Saw-Teeth, of which the following is a specification.

Our invention relates to devices for filing saw teeth, and particularly to a tool designed for leveling saw teeth and capable of manual operation.

The primary object of our invention is the provision of a simple and effective saw tooth leveler having an abrading member adapted to rest flat upon the edge face of the teeth, guiding means, and a handle whereby the abrading member may be manually reciprocated over the face of the teeth.

A further object is the provision of a device of this character including a handle adapted to be connected to or engaged with a file of ordinary construction, and a guiding device also adapted to be detachably mounted upon the file and to engage the saw to guide the file in its reciprocating movements.

A further object is to provide a device of this character in which the handle has a wedging engagement with the shank of the file so as to permit the device to be used with files of various sizes.

Our invention is illustrated in the accompanying drawings wherein:

Figure 1 is a side view of a saw showing our tooth leveling devices applied thereto, the handle and guide being partly in section. Fig. 2 is a perspective view of the guide, the parts being separated from each other. Fig. 3 is a perspective view of the handle. Fig. 4 is a longitudinal section of the guides shown in Fig. 2, the screw, however, being omitted.

Corresponding and like parts are referred to in the following description and indicated in all the views of the accompanying drawings by the same reference characters.

Referring to these figures, 2 designates a flat file of any ordinary construction and having a tapered shank 3. The handle 4 is upwardly and rearwardly bowed, the curvature of the handle, however, not being regular but the rear end of the handle being nearly horizontal while the forward end of the handle is inclined downward toward the file at an angle of about 45°. The rear end of the handle is formed with an upwardly extending slot 5 laterally enlarged at its upper end as at 6 to receive the shank 3 of the file. The portion 5 of the slot has a width only slightly greater than that of a saw so that after the file is put in place within the handle, the rear end of the handle may be placed over the saw and the saw will be received within the slot 5. The forward end of the handle has a beveled face 7 adapted to rest flat upon the face of the file. Inasmuch as the shank 3 of the file is tapered, it may be forced into wedging engagement with the handle so that the handle and file will be held firmly engaged with each other.

In connection with the handle 4 we provide a guide, also adapted to be attached to the file and to engage the saw. This guide comprises a split tube designated 8. The tube is split upward through its middle so as to form a slot 9 which at its upper end is laterally enlarged as at 10. The opposite sides of the tube are transversly slotted as at 11, these slots 11 opening into the enlargements 10 of the slots 9 and forming a continuation thereof. The slots 11 are of a width sufficient to permit the passage of the file through the guiding member 8. The slots 9 are of a width just sufficient to receive the saw blade. The upper end of the tube is formed with a head 12, this head being preferably screw threaded into the upper end of the tube. The head is annular and is interiorly screw threaded for engagement with a set screw 13 having a wing 14 whereby it may be manipulated.

When using this device, the guide 8 is first placed upon the file, the body of the file being passed through the slots 11. The set screw 13 is then turned down until it bears against the file and locks the guiding member 8 to the file. The shaft 3 is then inserted through the slotted portion 6 at the rear end of the handle, and the handle forced along the file until the shank is in wedging engagement with the slot 6. The device is then ready for use. It is placed upon the saw with the file resting flat upon the points of the saw teeth, the depending rear end 15 of the handle 4 embracing the saw blade, and the guide 8 also embracing the saw plate. By pushing upon this device in the manner of a plane, the teeth may be accurately leveled. The filing action is of course secured upon the forward stroke of the file, and the file is then slightly lifted from the saw for the return stroke. It will be seen that our invention is economical, permits any desired character of file to be used, may be easily applied, easily removed and is adapted to be packed into small compass.

What we claim is:

1. A saw tooth leveling device including an elongated flat abrading member, a handle engaging the abrading member, and a saw engaging guide independent of the handle and adjustably mounted on the abrading member.

2. A saw tooth leveling device including a flat abrading member, a detachable handle coacting with and engaging the abrading member, guiding means on the handle engaging the saw, and a saw-engaging guide detachably mounted upon the abrading member.

3. A saw tooth leveling device including a flat abrading member, a handle secured to but detachable from the abrading member, said handle being slotted at its rear end to embrace a saw, and a guide detachably engaging the abrading member and extending down beyond the same in a direction away from the handle, said guide being slotted to embrace the saw.

4. A saw tooth leveling device including a bowed file engaging member constituting a handle, a file detachably carried by the handle, and a guide independent of the handle carried by but detachable from the file, said guide being bifurcated to receive the saw.

5. A saw tooth leveling device including a file having a tapered shank, a bowed handle formed at one end with a laterally extending slot through which the tapered shank passes and with a vertical slot communicating with the first named slot and designed to receive the edge margin of the saw, and a guide carried by the file, said guide comprising a body portion transversely slotted for the reception of the file and vertically slotted to embrace the margin of the saw.

6. A saw tooth leveling device including a file having a tapered shank, an upwardly bowed handle resting flat upon the file at one end and at the other formed with a vertical slot to receive the margin of the saw and with a horizontal slot to receive the tapered shank of the file, and a guide mounted upon the file and comprising a body portion horizontally slotted to receive the file, and vertically slotted to receive the margin of the saw, and a set screw passing through the upper end of the body portion and adapted to engage the upper face of the file and lock the guide in place thereon.

7. A saw tooth leveling device including a bowed file engaging member constituting a handle, a file detachably carried by the handle, and a guide comprising a body portion transversely slotted for the reception of the file and vertically slotted to embrace the margin of the saw, said guide being adjustable along the length of the file, and means carried by the guide for clamping it upon the file.

In testimony whereof we affix our signatures in presence of two witnesses.

EDVARD EASTLUND. [L. S.]
JOHN A. JOHNSON. [L. S.]

Witnesses:
Wm. H. Bloomer,
Joseph L. Stein.

---

Copies of this patent may be obtained for five cents each, by addressing the "Commissioner of Patents, Washington, D. C."